(12) United States Patent
Eicher

(10) Patent No.: US 10,702,102 B2
(45) Date of Patent: Jul. 7, 2020

(54) COFFEE MILL AND AUTOMATIC COFFEE MACHINE HAVING A COFFEE MILL

(71) Applicant: EUGSTER/FRISMAG AG, Amriswil (CH)

(72) Inventor: Heinz Eicher, Jona (CH)

(73) Assignee: EUGSTER/FRISMAG AG, Amriswil (CH)

(*) Notice: Subject to any disclaimer, the term of this patent is extended or adjusted under 35 U.S.C. 154(b) by 70 days.

(21) Appl. No.: 15/739,208

(22) PCT Filed: Jan. 12, 2017

(86) PCT No.: PCT/EP2017/050520
§ 371 (c)(1),
(2) Date: Dec. 22, 2017

(87) PCT Pub. No.: WO2017/148603
PCT Pub. Date: Sep. 8, 2017

(65) Prior Publication Data
US 2019/0000271 A1 Jan. 3, 2019

(30) Foreign Application Priority Data
Mar. 2, 2016 (DE) .................. 10 2016 103 747

(51) Int. Cl.
*A47J 42/26* (2006.01)
*A47J 42/36* (2006.01)
(Continued)

(52) U.S. Cl.
CPC .............. *A47J 42/36* (2013.01); *A23F 5/08* (2013.01); *A23F 5/26* (2013.01); *A47J 31/42* (2013.01);
(Continued)

(58) Field of Classification Search
CPC .. A47J 42/36; A47J 42/00; A47J 31/42; A47J 42/46; F16H 1/36; F16H 1/28; F16H 2001/2881; F16H 1/2818; A23F 5/08
See application file for complete search history.

(56) References Cited

U.S. PATENT DOCUMENTS 6,056,217 A * 5/2000 Friden .................. A47J 42/06
241/135
2013/0313495 A1* 11/2013 Chenon ............... B66D 1/7494
254/344
(Continued)

FOREIGN PATENT DOCUMENTS

CN 1045437 A 9/1990
CN 202143422 U 2/2012
(Continued)

OTHER PUBLICATIONS

International search report for Apln. No. PCT/EP2017/050520 dated Apr. 24, 2017.
(Continued)

*Primary Examiner* — Jun S Yoo

(57) ABSTRACT

A coffee grinder, in particular for the installation in a fully-automatic coffee machine, including an electric drive motor (1) for driving a grinding unit, wherein a reduction gear (4) formed as a planetary gear is arranged between drive motor (1) and grinding unit, with the sun gear (3) of this planetary gear being drivable by the drive motor (1). The planetary gear includes multiple planetary rods (8) arranged in the circumferential direction around the sun gear (3), these rods including a first axial portion (7) meshing with the sun gear (3) as well as an axially neighboring, second axial portion (9) with a second diameter different from, preferably smaller than, a first diameter of the first axial portion (7), with this second axial portion meshing with a stationary ring
(Continued)

gear (11). The toothed racks are arranged to drive an output element (15) with their first axial portions (7).

16 Claims, 2 Drawing Sheets

(51) Int. Cl.
    *A47J 31/42*     (2006.01)
    *A47J 42/00*     (2006.01)
    *F16H 1/36*     (2006.01)
    *A23F 5/08*     (2006.01)
    *A23F 5/26*     (2006.01)
    *A47J 42/40*     (2006.01)
    *F16H 1/28*     (2006.01)
    *F16H 57/02*     (2012.01)

(52) U.S. Cl.
    CPC ............... *A47J 42/00* (2013.01); *A47J 42/40* (2013.01); *F16H 1/28* (2013.01); *F16H 1/36* (2013.01); *F16H 57/02* (2013.01); *F16H 2001/2881* (2013.01); *F16H 2057/02034* (2013.01)

(56) References Cited

U.S. PATENT DOCUMENTS

2015/0354668 A1    12/2015   Bouwer et al.
2018/0325320 A1*  11/2018   Guo .................... A47J 31/42

FOREIGN PATENT DOCUMENTS

| CN | 105090380 A | 11/2015 |
| DE | 3619126 C1 | 6/1992 |
| DE | 19845182 A1 | 4/2000 |
| DE | 102012206162 A1 | 10/2013 |

OTHER PUBLICATIONS

German office action for Apln. No. 10 2016 103 747.8 dated Dec. 15, 2016.

* cited by examiner

COFFEE MILL AND AUTOMATIC COFFEE MACHINE HAVING A COFFEE MILL

BACKGROUND OF THE INVENTION

The invention relates to a coffee grinder, in particular for the installation in fully automatic coffee machines, including an electric drive motor for driving a grinding unit, wherein a reduction gear being configured as a planetary gear is arranged between the drive motor and the grinding unit, with the sun gear of the planetary gear configured and arranged to be drivable by the drive motor.

Furthermore, the invention relates to a fully automatic coffee machine having an integrated coffee grinder.

Fully automatic coffee machines use coffee grinders which automatically produce coffee bean powder from coffee upon product selection on behalf of the user, which coffee bean powder is then leached with hot water in a brewing unit in order to produce a coffee drink.

Known, integral coffee grinders come with the disadvantage of generating too much noise, which is in part considered to be disturbing, and they can be assembled and/or put into operation with high efforts only due to their high number of parts. Furthermore, the axial construction length (along the axis of rotation) of integral coffee grinders has potential for improvement, since construction space in an enclosure of the fully automatic coffee machine is limited.

DE 10 2012 206 162 A1 discloses a kitchen appliance with a three-stage planetary gear, the gear system having three output-side drive shafts in a coaxial geometry.

DE 36 19 126 C1 discloses a kitchen appliance which is configured as a corn mill with a planetary gear.

US 2015/0257600 A1 describes a spice mill having a planetary gear.

SUMMARY OF THE INVENTION

Based upon the above-mentioned prior art, the object underlying the invention is to provide an improved coffee grinder for the use in fully automatic coffee machines. Compared to the prior art, the coffee grinder of the present invention is preferably characterized by a reduced number of parts and a most small axial construction length. Preferably, noise generation of the coffee grinder should be reduced.

Furthermore, the object is to provide a fully automatic coffee machine which is equipped with an accordingly improved coffee grinder.

With respect to the coffee grinder, this object is achieved by means of the features disclosed herein, i.e. in the case of a generic coffee grinder, it is achieved in that the planetary gear comprises multiple planetary rods arranged in the circumferential direction around the sun gear, which include a first axial portion meshing with the sun gear and an axially-neighboring, preferably directly adjacent second axial portion with a second diameter different from and preferably smaller than a first diameter of the first axial portion and meshing with a stationary ring gear, and in that the toothed racks, with their first axial portions, are arranged so as to drive a driving element (for driving the grinding unit). The axial portions rotate at the same speed both around the respective rotary axis of the planetary rods and around the respective rotary axis of the sun gear arranged parallel to the planetary rotary axes, with the rotary axis of the sun gear being preferably aligned with a rotary axis of the drive motor.

With respect to the fully automatic coffee machine, the object is achieved by means of the features disclosed herein.

Advantageous further developments of the invention are also indicated herein. The scope of the invention also includes all combinations of at least two features disclosed in the description, the claims and/or the figures.

The idea underlying the invention, preferably in a coffee grinder integrated or able to be integrated in a fully automatic coffee machine, is to form the planetary gears as planetary rods having a correspondingly large axial extent, and to equip these planetary rods with two axially-neighboring, either axially-spaced or preferably directly axially-adjacent axial portions for two different gear stages, with the axial portions also differing with respect to their diameter measured perpendicular to the rotary axis of the sun gear and preferably also in terms of their number of teeth. Here, the planetary rods are arranged about a rotary axis (axis of rotation) defined by the sun gear driven by means of the drive driven by the electro-motoric drive, with the sun gear meshing with the first axial portions of the planetary rods, and with the first axial portions preferably having a larger diameter measured perpendicular to the above-mentioned rotary axis than the second axial portions. Due to the fact that always a first axial portion and a second axial portion are formed on a shared planetary rod, these portions rotate at the same rotational speed about the respective rotary axis of the planetary gear extending parallel to the rotary axis of the sun gear mentioned above. The planetary rods, with the axial portions thereof, mesh with a stationary ring gear, i.e. with an inner toothing of the ring gear, which is preferably formed in one piece with the gear case, which is why the planetary rods rotate about the rotary axis of the sun gear. Due to this rotating movement and the meshing arrangement of the first axial portions with a drive element, the first axial portions drive the output element, in a rotating fashion, about the rotary axis of the sun gear.

A coffee grinder formed according to the concept of the present invention provides important advantages compared to known coffee grinders. This involves the number of parts being small due to the provision of planetary rods engaging across the gear stages, which facilitates assembly and maintenance. In addition, the axial construction length (along the rotary axis of the sun gear mentioned above) is reduced. Another essential advantage lies with the fact that high reduction ratios can be achieved by means of the arrangement according to the invention despite the reduced construction space and the reduced number of parts. Furthermore, noise generation is considerably less than in known coffee grinders, in particular if the sun gear and the first axial portions for intermeshing as well as the inner toothing of the output element for meshing with the first axial portions are provided with a helical toothing, i.e. with teeth arranged next to one another in the circumferential direction, the axial ends of which are in each case not arranged at the same circumferential angle about the rotary axis of the sun gear but at different circumferential angles, i.e. spaced in the circumferential direction about the rotary axis of the sun gear, such that the teeth or tooth flanks do not extend linear axially, but are at the same time inclined in the circumferential direction with respect to their axial extension.

In view of implementing a particularly reduced axial extension, it has proven of advantage if a shaft that drives the sun gear projects axially through a second gear stage including the second axial portions, with this second gear stage axially neighboring the first gear stage including the sun gear and the first axial portions. The shaft can be shaft formed in one or multiple piece/s, which is completely or sectionally formed by the motor shaft of the drive motor or by a shaft separate from the drive motor shaft.

In order to provide a cost-efficient configuration of the toothed racks which are optimized in terms of noise generation, it has proven to be advantageous to form these toothed racks in a monolithic manner, in particular in the form of injection-molded plastic parts.

As already mentioned, due to the special configuration of the coffee grinder, it is possible to realize high reduction ratios. It is particularly preferable when the diameter of the axial portions are adapted to one another in such a way that a reduction ratio of more than 20:1, preferably more than 25:1, even more preferably of more than 30:1, is realized by means of the planetary gear. Particularly good experience was achieved at a reduction ratio of approximately 32:1.

In terms of construction, an embodiment in which the stationary (i.e. rotationally fixed) ring gear meshing with the second axial portions is formed on the inner circumference of a gear case which radially surrounds the first and second axial portions on the outside is of particular advantage. In other words, the stationary ring gear is realized as an inner toothing of a gear case, the axial extension of which includes the two axial portions of the planetary gears. It is particularly preferable when the drive element is supported in this gear case via a rolling bearing and preferably forms an axial termination for the gear case. In other words, it is expedient when the drive element extends axially into a region radially between the first axial sections and the inner circumference of the gear case, on which the drive element is supported in the radial direction outward via a roller bearing.

It is particularly expedient for the formation of a unit composed of planetary gear and drive motor when the gear case is rotationally-fixed to a motor case of the drive motor e.g. by an axial screw-connection.

Particularly preferably, the drive element, at least on the end region facing the planetary rods, is a hollow shaft which has a toothing on the inner circumference, in particular a helical toothing for meshing with the first axial portions.

It is particularly expedient when the drive element is coupled with an ejector disk in a rotationally-fixed manner, as is often used in coffee grinders of fully-automatic coffee machines in order to transport the coffee powder escaping the grinding unit radially outward in the direction of a brewing chamber. It is further preferable when the ejector disk is coupled with a rotatable grinding element in a rotationally-fixed manner, in particular via a friction clutch, with the grinding element bring driven by means of the drive motor via the planetary gear.

The invention also relates to a fully-automatic coffee machine having a brewing unit and a coffee grinder according to the invention, wherein coffee grinder and brewing unit are operatively connected in such a way that coffee powder generated in a grinding process by means of the grinding unit enters the brewing unit and is leached there by adding hot water, which is why a coffee drink can be produced.

Further advantages, features and details of the invention result from the following description of preferred exemplary embodiments as well as by means of the figures.

DETAILED DESCRIPTION

Figure 1:
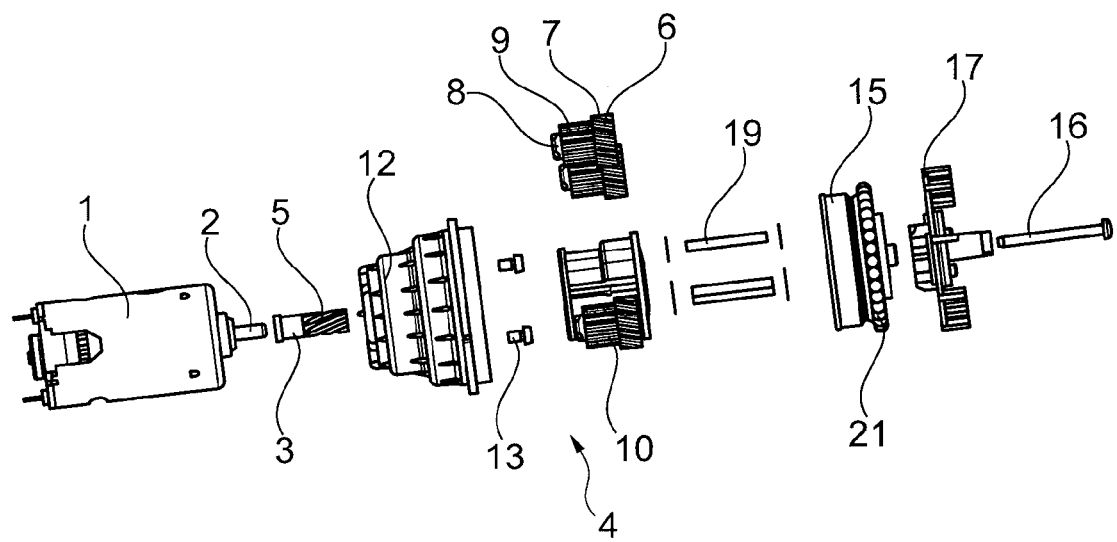
FIG. 1: an exploded view of the combination of drive motor, planetary gear as well as ejector disk of a coffee grinder for the integration on a fully-automatic coffee machine (the illustration of further grinding unit components such as a grinding cone and a grinding ring is omitted for a better understanding)

The same elements and elements having the same function are indicated with the same reference numerals throughout the figures.

An electric drive motor 1 of a coffee grinder of a fully-automatic coffee machine is shown in FIG. 1 in the drawing plane on the left.

The drive motor 1 is coupled with a sun gear of a reduction gear 4 formed as a planetary gear via a motor shaft 2. It is discernable that the sun gear 3, on the outer circumference thereof, has a helical toothing 5, by means of which it meshes a mating, likewise helical, toothing 6 of first axial portions 7 of planetary rods 8 monolithic on the outer circumference. The planetary rods 8 formed in the circumferential direction around the sun gear 3 and each comprise besides a first helically toothed axial protrusion 7 an axially neighboring, in this case directly adjacent second axial portion 9, which has a smaller diameter than the neighboring first axial portion 7. The second axial portions 9 in each case mesh, via their respective outer toothing 10, a rotationally-fixed ring gear 11, specifically an inner toothing (see FIG. 2), which is arranged in one piece with and on the inner circumference of a gear case 12, which is axially fixed to a motor case 14 of the drive motor 1 via fixing screws 13.

The mating toothing 6 of the first axial portions 7 mesh with a output element 15 which is configured as a hollow shaft, which closes, on the face side, the gear case 12 axially extending over the entire length of the planetary rods 8 on the axial side facing away from the drive motor 1. An ejector disk 17 of the grinding unit is coupled to the output element 15 in a rotationally-fixed manner, which ejector wings 18 are distributed over the circumference in order to eject milled material, i.e. coffee powder, in the radial direction outward, toward a brewing unit which is not shown. Here, a friction clutch is realized preferably between ejector disks 17 and a grinding element, in particular a grinding ring or a cone of a friction clutch arranged therein. In the exemplary embodiment shown, the planetary rods comprise a rod rotary axis 19, which axially extends through the respective planetary rod 8 and are received in axially neighboring brackets 20 (see FIG. 2). FIG. 1 shows a fixing element formed as a screw, indicated at reference numeral 16, for axially securing a grinding element to the ejector disk 17.

Figure 2:
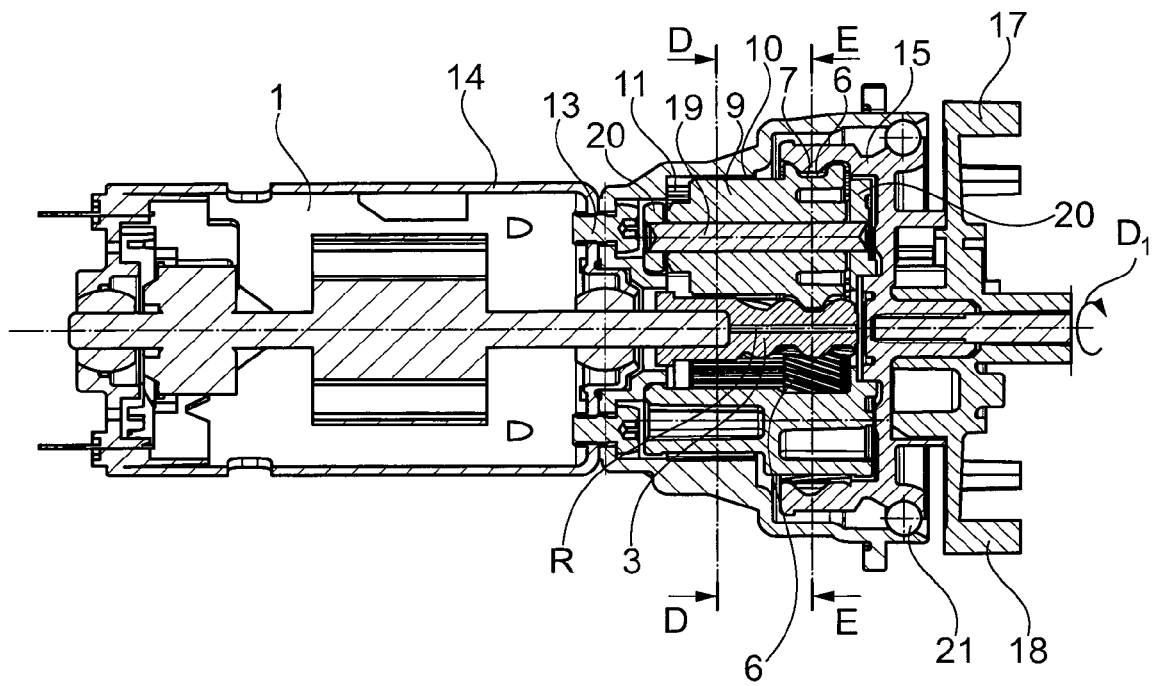
FIG. 2: a longitudinal sectional view of the combination of FIG. 1, FIG. 3: a sectional illustration along the section S-D of FIG. 2, and FIG. 4: a sectional illustration along section E-E of FIG. 2, wherein this viewing direction is the one that defines the clockwise and anti-clockwise rotary directions.

FIG. 2 shows that the output element 15 is supported in the radial direction outward on the gear case 12 via a roller bearing 21 configured as a ball bearing, which forms the stationary ring gear 11 by comprising an inner toothing formed integrally with the gear case 12.

FIG. 2 further shows that a shaft formed by the motor shaft 2 as well as a lower portion of the sun gear 3 extends through the second axial portions 9 or an interspace defined by them (radial inner space/center) in the axial direction, so that the sun gear 3 gets into a toothing engagement with the mating helical toothing 6 of the first axial portions 7.

Figure 3:
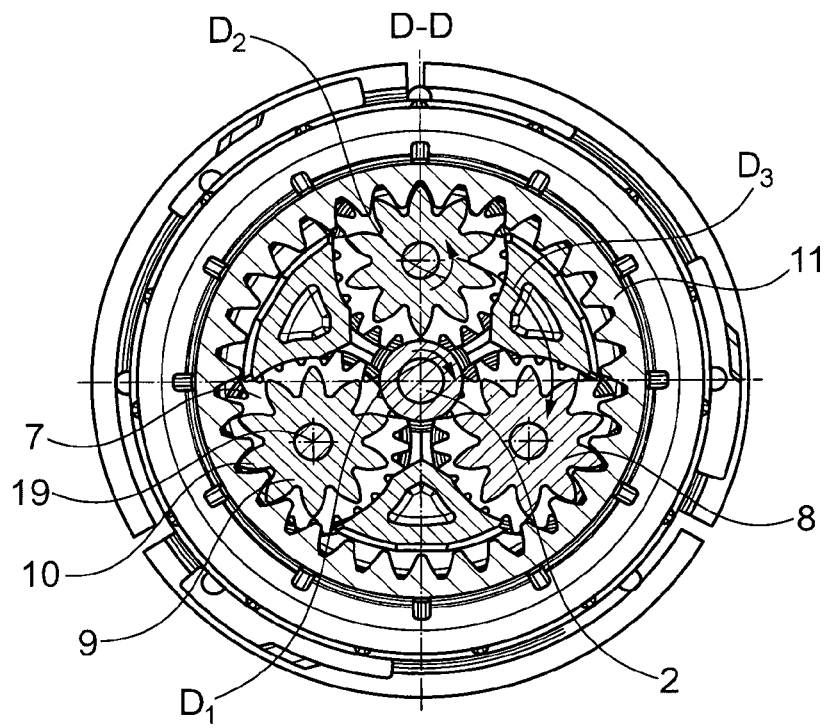
Figure 4:
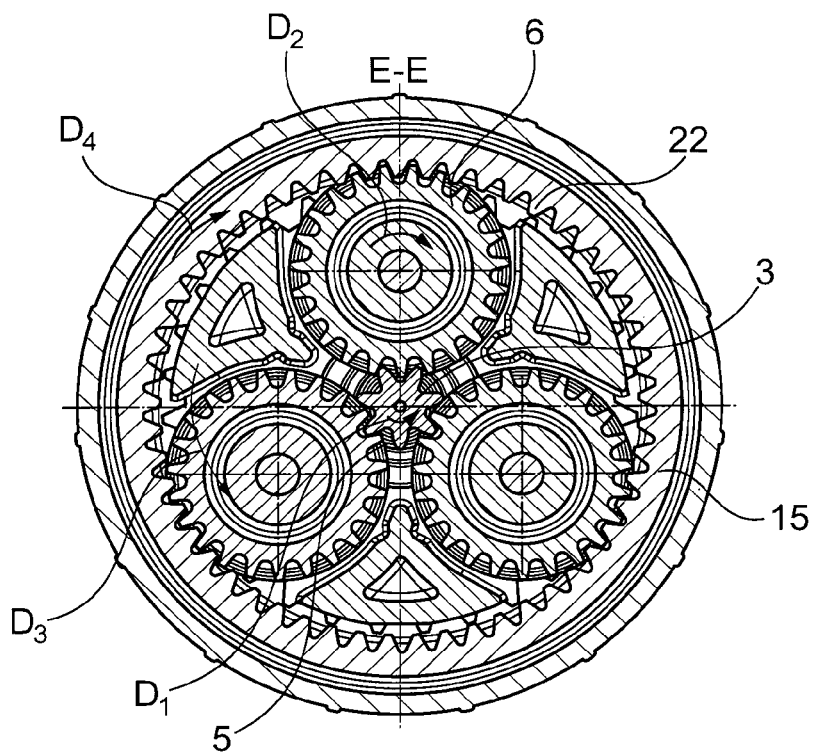

When the drive motor 1 is operated, the sun gear 3 rotates in the direction of the gear or in the direction of the drive motor, with a viewing direction from a grinding unit, i.e. from right or left in FIGS. 1 and 2, e.g. in the anti-clockwise direction, as indicated in FIG. 2 and FIG. 4, namely around a rotary axis or an axis of rotation R, parallel to which the rod rotary axes 19 are arranged. Due to the helical toothing engagement of the helical toothing 5 and the mating helical toothing 6, the planetary rods 8 rotate around their respective rod rotary axis 19 in the clockwise direction. As the planetary rods 8 mesh via the toothing of their second axial portions 9 with the stationary ring gear 11, the planetary rods 8 move in the circumferential direction about the axis of rotation R, namely in the anti-clockwise direction, as can be taken from the illustration of FIG. 3, in which it is to be observed that the viewing direction of the above-mentioned illustration of FIG. 3 is opposite the viewing direction of FIG. 4 for the definition of the rotary directions. Here, the rotary direction $D_1$ of the shaft 2 as well as the resulting rotary direction $D_2$ of the planetary rods 8 about their respective planetary rod rotary axis 19 are discernable. Due to the meshing arrangement of the second axial portions 9 with the stationary ring gear 11, the planetary rod arrangement 19 rotates in a rotary direction $D_3$ that coincides with the rotary direction $D_1$. Die to the helical toothing engagement between the mating toothing 6 and an inner helical toothing 22 of the output element 15, the latter is rotated in the direction $D_4$, which coincides with the rotary direction $D_2$.

The specific illustrated variant of the planetary gear comprises a reduction ratio of 32.4:1.

REFERENCE NUMERALS

1 Electric motor
2 Motor shaft
3 Sun gear
4 Reduction gear
5 Helical toothing
6 Mating helical toothing
7 First axial portions
8 Planetary rods
9 Second axial portions with smaller diameter than the first axial portions
10 External toothing
11 Stationary ring gear (stationary inner toothing)
12 gear case
13 Fixing screws
14 Motor case
15 Output element
16 Fixing element
17 Ejector disk
18 Ejector wing
19 Rod rotary axes
20 Brackets
21 Roller bearing
22 Helical inner toothing
R Axis of rotation (rotary axis of the sun gear)
$D_1$ Rotary direction of the sun gear around the axis of rotation
$D_2$ Rotary direction of the planetary rods around rod rotary axes
$D_3$ Rotary direction of the planetary rods around the axis of rotation R
$D_4$ Rotary direction of the drive element

The invention claimed is:

1. A coffee grinder for installation in fully-automatic coffee machines, including an electric drive motor (1) for driving a grinding unit, wherein a reduction gear (4) formed as a planetary gear is arranged between the drive motor (1) and the grinding unit, with a sun gear of this planetary gear (3) being drivable by the drive motor (1),
wherein
the planetary gear comprises multiple planetary rods (8) arranged in a circumferential direction around the sun gear (3), these rods including a first axial portion (7) meshing with the sun gear (3) as well as an axially neighboring, second axial portion (9) with a second diameter different from a first diameter of the first axial portion (7), with this second axial portion meshing with a stationary ring gear (11), and wherein toothed racks are arranged to drive an output element (15) with their first axial portions (7).

2. The coffee grinder of claim 1, wherein the sun gear (3), the first axial portions (7) and the output element (15) comprise a helical toothing (5) having teeth, in which axial tooth ends of the teeth are spaced in the circumferential direction.

3. The coffee grinder of claim 1, wherein the second axial portions (9) are arranged radially neighboring a shaft coupling the drive with the sun gear (3), which axially extends through an interspace region between the second axial portions (9).

4. The coffee grinder of claim 1, wherein the toothed racks are formed in a monolithic manner.

5. The coffee grinder of claim 4, wherein the toothed racks are injection-molded plastic parts.

6. The coffee grinder of claim 1, wherein the planetary gear has a reduction ratio of more than 20:1.

7. The coffee grinder of claim 6, wherein the reduction ratio is more than 25:1.

8. The coffee grinder of claim 6, wherein the reduction ratio is more than 30:1.

9. The coffee grinder of claim 6, wherein the reduction ratio is between 30:1 and 50:1.

10. The coffee grinder of claim 1, wherein the stationary ring gear (11) is formed on an inner circumference of a gear case (12), which radially surrounds the first (7) and second axial portions (9) on the outside.

11. The coffee grinder of claim 10, wherein the gear case (12) is rotationally-fixed to a case of the drive motor (1).

12. The coffee grinder of claim 11, wherein the gear case (12) is fixed axially to the case of the drive motor (1).

13. The coffee grinder of claim 1, wherein the output element (15) is at least sectionally formed as a hollow shaft.

14. The coffee grinder according to claim 1, wherein a friction clutch is arranged between the planetary gear and the grinding unit and/or wherein the output element (15) is arranged so as to drive an ejector disk (17), which is coupled with a rotatable grinding element via the friction clutch.

15. A fully-automatic coffee machine, including a coffee grinder according to claim 1 as well as a brewing unit for leaching coffee powder produced by means of the coffee grinder.

16. The coffee grinder of claim 1, wherein the second diameter is smaller than the first diameter.

* * * * *